US011487572B1

(12) United States Patent
Sabin

(10) Patent No.: US 11,487,572 B1
(45) Date of Patent: Nov. 1, 2022

(54) MIGRATION OF CLOUD-BASED SOFTWARE APPLICATION

(71) Applicant: CITRIX SYSTEMS, INC., Fort Lauderdale, FL (US)

(72) Inventor: Michael Sabin, Fort Lauderdale, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 17/233,181

(22) Filed: Apr. 16, 2021

(51) Int. Cl.
*G06F 9/455* (2018.01)
*G06F 9/451* (2018.01)
*H04L 67/1001* (2022.01)

(52) U.S. Cl.
CPC .......... *G06F 9/45558* (2013.01); *G06F 9/452* (2018.02); *H04L 67/1001* (2022.05); *G06F 2009/4557* (2013.01)

(58) Field of Classification Search
None
See application file for complete search history.

(56) References Cited

U.S. PATENT DOCUMENTS

| 8,954,574 | B1* | 2/2015 | Chheda | G06Q 20/085 |
| | | | | 709/224 |
| 9,977,687 | B2* | 5/2018 | Kottomtharayil | G06F 9/45533 |
| 10,417,102 | B2* | 9/2019 | Sanakkayala | H04L 43/10 |
| 10,838,708 | B2* | 11/2020 | Sinha | G06F 3/0619 |
| 10,860,363 | B1* | 12/2020 | Gabrielson | G06F 9/4418 |
| 2014/0149983 | A1* | 5/2014 | Bonilla | G06F 3/0619 |
| | | | | 718/1 |
| 2018/0129523 | A1* | 5/2018 | Bryant | G06F 1/3203 |
| 2020/0192689 | A1* | 6/2020 | Smith, IV | G06F 9/4856 |
| 2020/0341864 | A1* | 10/2020 | Agrawal | G06F 11/1461 |
| 2020/0394110 | A1* | 12/2020 | Ramohalli Gopala Rao | ............... |
| | | | | H04L 67/1097 |
| 2020/0409738 | A1* | 12/2020 | Naidu | G06F 3/067 |
| 2021/0042195 | A1* | 2/2021 | Sancheti | G06F 11/1469 |
| 2021/0064408 | A1* | 3/2021 | Gill | G06F 9/485 |
| 2021/0349637 | A1* | 11/2021 | Shemer | G06F 3/0619 |

\* cited by examiner

*Primary Examiner* — Kenneth Tang
(74) *Attorney, Agent, or Firm* — Mintz Levin Cohn Ferris Glovsky and Popeo, P.C.

(57) ABSTRACT

A method for migrating a virtual desktop may include provisioning a first virtual machine to host the virtual desktop. The first virtual machine may be provisioned to include a first operating system disk and a first identity disk. A snapshot of the first operating system disk may be generated. The virtual desktop may be migrated to a second virtual machine by at least replacing a second operating system disk of the second virtual machine with the first operating system disk. The first identity disk of the first virtual machine and a second identity disk of the second virtual machine may remain unchanged by the migration. Related systems and articles of manufacture are also provided.

22 Claims, 7 Drawing Sheets

MIGRATION OF CLOUD-BASED SOFTWARE APPLICATION

TECHNICAL FIELD

The subject matter described herein relates generally to computing systems and more specifically to the migration of hosted software applications.

BACKGROUND

Cloud computing can include the on-demand availability of a pool of shared computer networks, server, data storage, software applications, and services, without direct active management by the user. The phrase can be generally used to describe data centers available to many users over the Internet. Large clouds often have functions distributed over multiple locations from central servers.

Some cloud computing providers can allow for scalability and elasticity via dynamic (e.g., "on-demand") provisioning of resources on a fine-grained, self-service basis. This can provide cloud computing users the ability to scale up when the usage need increases or down if resources are not being used.

SUMMARY

Methods, systems, and articles of manufacture, including computer program products, are provided for migrating a cloud-based software application such as a virtual desktop. In one aspect, there is provided a system including at least one data processor and at least one memory. The at least one memory may store instructions, which when executed by the at least one data processor, cause the at least one data processor to at least: provision a virtual machine to host an application, the virtual machine including a first operating system disk; generate a snapshot of the first operating system disk, the snapshot comprising data capturing a state of the first operating system disk at a particular point in time; and migrate the application to another virtual machine, the migration including replacement of a second operating system disk of the another virtual machine with use of the snapshot of the first operating system disk such that a second identity disk of the second virtual machine remains unchanged upon migration.

In some variations, one or more of the features disclosed herein including the following features can optionally be included in any feasible combination.

In some variations, the application may include a virtual desktop configured to provide, at a client device communicatively coupled with at least the first virtual machine or the second virtual machine, a desktop operating system.

In some variations, the first operating system disk may store data associated with the virtual desktop. The data may include an operating system, one or more applications, and a user data.

In some variations, the virtual desktop may include a static virtual desktop configured to retain one or more changes applied to the virtual desktop upon restarting the first virtual machine or the second virtual machine hosting the virtual desktop.

In some variations, the first virtual machine may be further provisioned with a first identity disk storing a first data. The first data may provide the first virtual machine with an identity different than one of the second virtual machine.

In some variations, the first virtual machine may be included in a first data center.

In some variations, the first data center and the second data center may be included in a same region or different regions. The regions may include one or more data centers within a latency-defined perimeter and connected through a dedicated regional low-latency network.

In some variations, the application may be migrated in response to the first data center having performance below a threshold or the second data center having a better performance than the first data center.

In some variations, the application may be migrated in response to an outage at the first data center.

In some variations, the migrating of the application may further include placing the second virtual machine in a maintenance mode or powering off the second virtual machine prior to replacement of the second operating system disk.

In some variations, the provisioning of the first virtual machine may include providing a first catalog including the first virtual machine.

In some variations, the snapshot of the first operating system disk may be generated in response to a request to migrate the virtual desktop.

In some variations, the snapshot of the first operating system disk may be generated based on a schedule or a periodic intervals.

In another aspect, there is provided a method for migrating a cloud-based software application such as a virtual desktop. The method may include: provisioning a virtual machine to host an application, the virtual machine including a first operating system disk; generating a snapshot of the first operating system disk, the snapshot comprising data capturing a state of the first operating system disk at a particular point in time; and migrating the application to another virtual machine, the migration including replacement of a second operating system disk of the another virtual machine with use of the snapshot of the first operating system disk such that a second identity disk of the second virtual machine remains unchanged upon migration.

In some variations, one or more of the features disclosed herein including the following features can optionally be included in any feasible combination.

In some variations, the application may include a virtual desktop configured to provide, at a client device communicatively coupled with at least the first virtual machine or the second virtual machine, a desktop operating system.

In some variations, the first operating system disk may store data associated with the virtual desktop. The data may include an operating system, one or more applications, and a user data.

In some variations, the virtual desktop may include a static virtual desktop configured to retain one or more changes applied to the virtual desktop upon restarting the first virtual machine or the second virtual machine hosting the virtual desktop.

In some variations, the first virtual machine may be further provisioned with a first identity disk storing a first data. The first data may provide the first virtual machine with an identity different than one of the second virtual machine.

In some variations, the first virtual machine may be included in a first data center. The first data center and the second data center may be included in a same region or different regions. The regions may include one or more data centers within a latency-defined perimeter and connected through a dedicated regional low-latency network.

In another aspect, there is provided a computer program product that includes a non-transitory computer readable medium. The non-transitory computer readable medium may store instructions that cause operations when executed by at least one data processor. The operations may include: provisioning a virtual machine to host an application, the virtual machine including a first operating system disk; generating a snapshot of the first operating system disk, the snapshot comprising data capturing a state of the first operating system disk at a particular point in time; and migrating the application to another virtual machine, the migration including replacement of a second operating system disk of the another virtual machine with use of the snapshot of the first operating system disk such that a second identity disk of the second virtual machine remains unchanged upon migration.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to migrating a cloud-based software application such as a virtual desktop, it should be readily understood that such features are not intended to be limiting. The claims that follow this disclosure are intended to define the scope of the protected subject matter.

DESCRIPTION OF DRAWINGS

When practical, like reference symbols in the various drawings indicate like elements.

DETAILED DESCRIPTION

Figure 1:
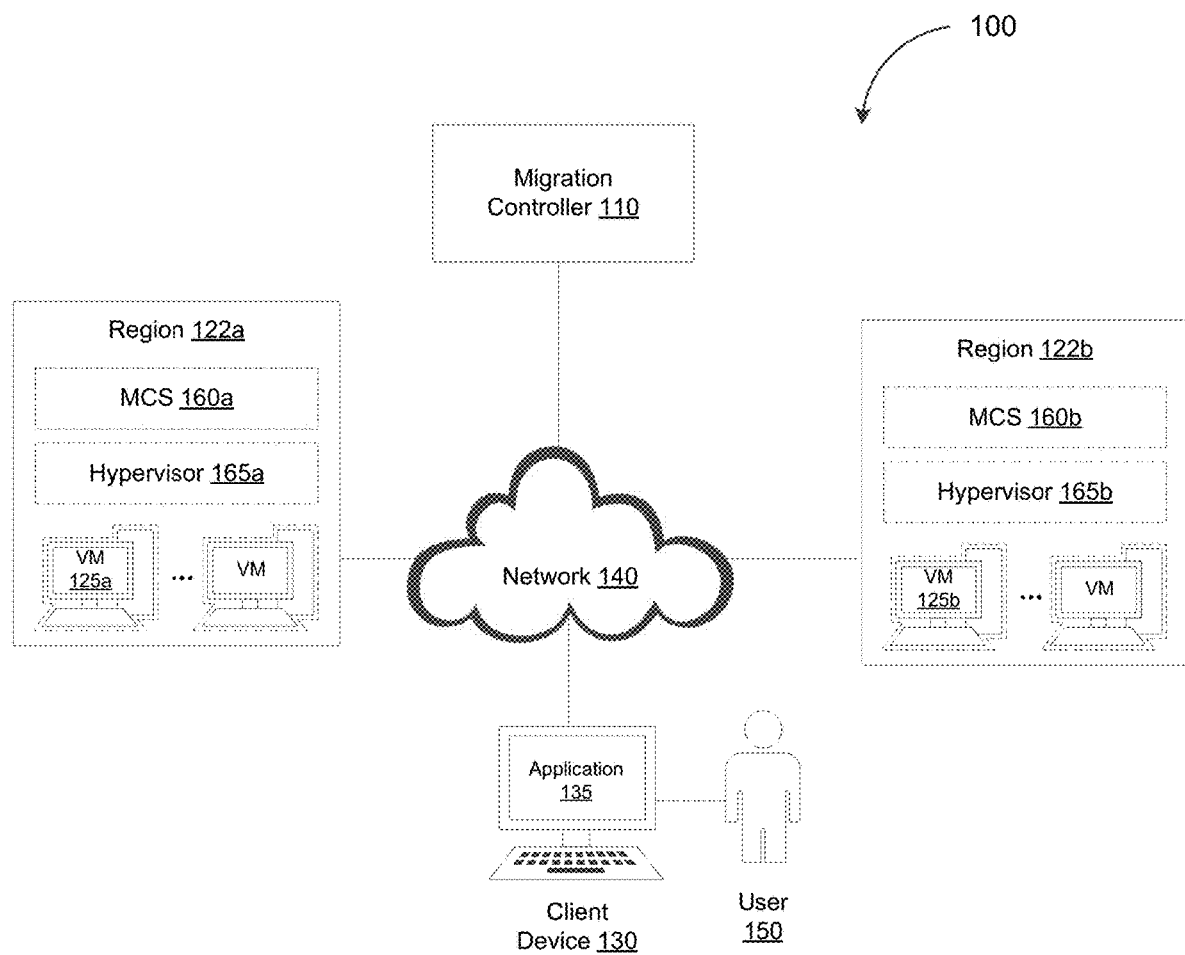
FIG. 1 depicts a system diagram illustrating an example of a computing system, in accordance with some example embodiments.

Desktop virtualization refers to technology for hosting desktop environments at a central server, for example, on one or more virtual machines. For example, virtual desktop infrastructure (VDI) for delivering virtual desktops to a client device over a network may be available as a cloud computing offering such as Desktop-as-a-Service (DaaS). With a virtual desktop infrastructure (VDI), a desktop environment and the applications associated with the desktop environment may be detached from the client devices used to access the desktop environment. Moreover, because virtual desktops are accessible from any location using lower performance client devices called "thin clients," desktop virtualization may increase user mobility while reducing the hardware overhead associated with the high performance personal computers and workstations required for supporting conventional non-virtual desktop environments.

A virtual desktop hosted on one or more virtual machines may provide, to a user at a client device, a desktop operating system. The user may be assigned a random non-persistent virtual desktop (e.g., a pooled virtual desktop or a multi-session virtual desktop), in which case the user may connect to a dynamically selected desktop with at login and the changes made to the desktop are lost upon restarting the virtual machines hosting the virtual desktop. Alternatively, the user may be assigned a static virtual desktop, meaning that the user may connect to the same desktop with each login. If the user is assigned a static non-persistent virtual desktop, the changes that are made to the virtual desktop are lost when the virtual machines hosting the virtual desktop are restarted, for example, by rebooting the virtual machines hosting the virtual desktops. Contrastingly, with a static persistent virtual desktop, the changes made to the virtual desktop may be retained even upon restarting the virtual machines hosting the virtual desktop.

Virtual desktops may, as noted, increase user mobility while reducing hardware overhead. A static virtual desktop may further enable users to apply changes, such as install custom applications, that remain accessible even after restarting the virtual machines hosting the virtual desktop. Despite the improvements to user mobility and hardware cost, a conventional static virtual desktop may lack portability. For example, a static virtual desktop hosted on virtual machines in a first data center in a first region may not be easily relocated to virtual machines in a data center in the first region or a second region at least because for virtual machines that are managed by a provisioning service, the provisioning service may expect the virtual machine to remain in a fixed location. As used herein, a "region" may refer to a set of data centers deployed within a latency-defined perimeter and connected through a dedicated regional low-latency network.

The challenges associated with relocating an application, such as a static virtual desktop, may impose de facto limits on user mobility, especially in scenarios where the relocation is necessary to maintain or optimize the performance of the application. For example, an inability to migrate a static virtual desktop from a first data center based in the United States to a second data center based in Australia may prevent a user from achieving optimal performance if a connection to the second data center is associated with a higher latency than a connection to the first data center. This may occur if the user of the static virtual desktop physically moves from the United States to Australia, rendering the first data center too geographically distant for optimal performance. Alternatively and/or additionally, the inability to migrate the static virtual desktop may thwart disaster recovery efforts in which the static virtual desktop is relocated, at least temporarily, from a first data center experiencing an outage or failover to a second data center unaffected by the outage such that the static virtual desktop may remain operational.

In some example embodiments, to enable the migration of an application, such as a virtual desktop, a first virtual machine provisioned to host the application may include an operating system (OS) disk and an identity disk. The operating system disk may store data associated with the application. In the case of a virtual desktop, for example, the operating system disk may store an operating system, one or more applications, and user data associated with the virtual desktop whereas data providing the first virtual machine with a unique identity (e.g., directory identity data and/or the like) may be stored on the identity disk. Migrating the application from the first virtual machine in a first data center in a first region to a second virtual machine in a second data center in the first region or a second region may include replacing the operating system disk of the second virtual machine with a snapshot of the operating system disk of the first virtual machine while maintaining the respective identity disks of the two virtual machines. As used herein, the term "snapshot" refers to data capturing a state of a system, such as an operating system disk, at a particular point in time.

Because the second virtual machine retains its own identity disk, which remains unchanged by the migration process, the second virtual machine may be able to operate in the second data center (and/or the second region) without changing the directory associated with the second data center (and/or the second region). By replacing the operating system disk of the second virtual machine with the snapshot of the operating system disk of the first virtual machine, the migration of the application may remain transparent to a user, who may continue to access the same application despite the application being relocated from the first virtual machine to the second virtual machine.

FIG. 1 depicts a system diagram illustrating an example of a computing system 100, in accordance with some example embodiments. Referring to FIG. 1, the computing system 100 may include a migration controller 110, a first region 122a including a first virtual machine 125a, a second region 122b including a second virtual machine 125b, and a client device 130. As shown in FIG. 1, the migration controller 110, the first region 122a, the second region 122b, and the client device 130 may be communicatively coupled via a network 140. The client device 130 may be a processor-based device including, for example, a smartphone, a personal computer, a tablet computer, a wearable apparatus, an Internet-of-Things (IoT) appliance, and/or the like. The network 140 may be a wired network and/or a wireless network including, for example, a local area network (LAN), a virtual local area network (VLAN), a wide area network (WAN), a public land mobile network (PLMN), the Internet, and/or the like. The migration controller 110 may include hardware and software for implementing various features disclosed herein. Moreover, in some cases, the migration controller 110 may be deployed in one or more of the first region 122a and the second region 122b.

In some example embodiments, the first region 122a and the second region 122b may be associated with a provider of a hosted application such as a virtual desktop infrastructure (VDI), web application, and Software-As-A-Service (SAAS) application. The first region 122a and the second region 122b may include one or more data centers deployed. The data centers may be present within a latency-defined perimeter and connected through a dedicated regional low-latency network. For example, as shown in FIG. 1, an application 135 at the client device 130 may be hosted on one or more virtual machines in the first region 122a such as the first virtual machine 125a. The application 135 may be a virtual desktop configured to provide, at the client device 130, a desktop operating system. As a static virtual desktop (e.g., a persistent virtual desktop), the application 135 may retain changes applied to the application 135 including, for example, customizations to applications and/or the like. The application 135, including the changes applied to the application 135, may remain accessible even after restarting the first virtual machine 125a.

The application 135 may increase user mobility and reduce hardware overhead at least because the application 135 may be accessible from any location even when the client device 130 is a lower performance "thin client" and not a high performance personal computer and workstation. Moreover, according to some example embodiments, the portability of the application 135, in particular where the application 135 is a static virtual desktop, may be increased by including a separate operating system (OS) disk and identity disk at each virtual machine hosting the application 135. For example, the first virtual machine 125a may include an operating system disk and an identity disk in order to enable the migration of the application 135 from the first virtual machine 125a in the first region 122a to the second virtual machine 125b in the second region 122b.

The operating system disk of the first virtual machine 125a may include an operating system, one or more applications, and user data associated with the application 135. As such, to migrate the application 135a from the first region 122a to the second region 122b, the migration controller 110 may replace the operating system disk of the second virtual machine 125b with a snapshot of the operating system disk of the first virtual machine 125a. The snapshot of the operating system disk of the first virtual machine 125a may include data capturing a state of an operating system of the first virtual machine 125a at a particular point in time. Meanwhile, the identity disk of the first virtual machine 125a and the second virtual machine 125b may store data, such as directory identity data and/or the like, that provides a unique identity to each virtual machine. Each virtual machine may be associated with a unique identity in order to avoid collisions between different virtual machines within the same region, for example, when different virtual machines interact with the servers in the domain such as the domain controller and application delivery controller. The first virtual machine 125a and the second virtual machine 125b may retain their respective identity disks, which are not modified as part of the migration process.

The migration of the application 135 may remain transparent, for example, to a user 150 at the client device 130, at least because the operating system disk of the second virtual machine 125b is replaced with the snapshot of the operating system disk of the first virtual machine 125a. For example, the snapshot of the operating system disk of the first virtual machine 125a may be generated and sent to the second virtual machine 125b where it replaces the operating system disk of the second virtual machine 125b such that the second virtual machine 125b operates using the snapshot of the operating system disk of the first virtual machine 125a. Once the client device 130 disconnects from the first virtual machine 125a and reconnects to the second virtual machine 125b, the user 150 may continue to access the same application 135 despite the application 135 being relocated from the first virtual machine 125a in the first region 122a to the second virtual machine 125b in the second region 122b. For instance, the a separate desktop may be published such that the user 150 may launch a separate desktop instance once the client device 130 is reconnected to the second virtual machine 125b now hosting the application 135.

The frequency at which snapshots of the operating system disk is generated may increase in order to reduce obsolescence of the contents of the snapshot. For example, the snapshot may be generated daily, although the at least some changes to the operating system disk made during the day may still be lost if the migration occurs between two successive snapshots. Nevertheless, concerns over snapshot obsolescence may be minimal at least because the snapshot is used to transfer the current state of the application 135 from the first virtual machine 125a to the second virtual machine 125b. Once the migration is complete, the client device 130 may resume interaction with the second virtual machine 125b starting from the point of time of the snapshot. It should be appreciated that subsequent changes to the application 135 may alter the state of the second virtual machine 125a.

Moreover, because the second virtual machine 125b retains its own identity disk, the second virtual machine 125b may be able to operate in the second region 122b without changing the directory (e.g., active directory (AD) and/or the like) associated with the second region 122b. Although FIG. 1 shows the application 135 as being migrated from the first virtual machine 125a in the first region 122a to the second virtual machine 125b in the second region 122b, it should be appreciated that the application 135 may also be migrated in a same or similar manner between virtual machines located in a same data center and/or region.

Figure 2:
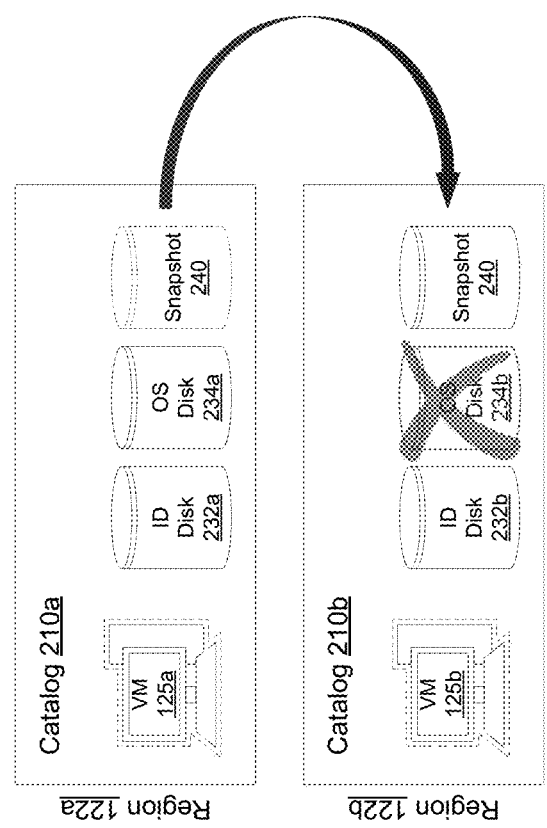
FIG. 2 depicts a schematic diagram illustrating an example of a workflow for migrating a hosted software application, in accordance with some example embodiments.

FIG. 2 depicts a schematic diagram illustrating an example of a workflow for migrating the application 135, in accordance with some example embodiments. Referring to FIGS. 1-2, the migration controller 110 may migrate the application 135 from the first virtual machine 125a in the first region 122a to the second virtual machine 125b in the second region 122b. In some example embodiments, collections of virtual machines may be managed as a single entity called a machine catalog or catalog. As shown in FIG. 2, the first virtual machine 125a may be part of a first catalog 210a associated with the first region 122a while the second virtual machine 125b may be part of a second catalog 210b associated with the second region 122b.

In some example embodiments, the first region 122a and the second region 122b may each include a provisioning service, such as a first machine creation service (MCS) 160a and a second machine creation service (MCS) 160b, for provisioning the virtual machines included in each catalog. It should be appreciated that the first machine creation service 160a and the second machine creation service 160b may be the same instance of a machine creation service (MCS). The first machine creation service 160a may provision the first virtual machine 125a included in the first catalog 210a of the first region 122a while the second machine creation service 160b may provision the second virtual machine 125b included in the second catalog 210b of the second region 122b. The first machine creation service 160a may interact with a first hypervisor 165a in the first region 122a, for example, using a corresponding application programming interface (API), to provision the first virtual machine 125a. Likewise, the second machine creation service 160b may use an application programming interface (API) of a second hypervisor 165b in the second region 122b to provision the second virtual machine 125b.

The provisioning of a virtual machine, such as the first virtual machine 125a and the second virtual machine 125b, may include a systems management process that creates a new virtual machine within a physical host server and allocates computing resources to support the virtual machine. A disk image may include a computer file containing the contents and structure of a disk volume or of an entire data storage device. The disk image can be made by creating a sector-by-sector copy of the source medium, thereby replicating the structure and contents of a corresponding storage device. In hardware virtualization, the virtual machine may be provisioned to implement virtual drives in order to emulate the behavior of a physical computer. A virtual disk is a software component that emulates an actual disk storage device. A virtual machine provisioned within a computing environment typically needs at least one virtual boot disk in order for the virtual machine to boot. In the case of desktop virtualization, the virtual machine may also be provisioned to include an operating system disk and an identity disk.

Referring again to FIG. 2, the first machine creation service 160a may provision the first virtual machine 125a to include a first identity disk 232a and a first operating system (OS) disk 234a while the second machine creation service 160b may provision the second virtual machine 125b to include a second identity disk 232b and a second operating system disk 234b. The first identity disk 232a may include data, such as directory identity data and/or the like, that provides a unique identity for the first virtual machine 125a. The first operating system disk 234a may include an operating system, one or more applications, and user data associated with the application 135.

To migrate the application 135 from the first virtual machine 125a to the second virtual machine 125b, the migration controller 110 may generate a snapshot 240 of the first operating system disk 232a of the first virtual machine 125a. The migration controller 110 may generate the snapshot 240 by generating a copy of the first operating system disk 232a, which captures the state of the first operating system disk 232a at a certain point in time. It should be appreciated that the functionalities associated with generating the snapshot 240 may be provided by a hypervisor or a cloud service associated with the first virtual machine 125a. The migration controller 110 may generate the snapshot 240 in response to receiving a request to migrate the application 135. For example, the migration controller 110 may generate the snapshot 240 in response to receiving, from the client device 130, a request to migrate the application 135. Alternatively and/or additionally, the snapshot 240 may be generated based on a schedule or at periodic intervals (e.g., daily, weekly, and/or the like).

As shown in FIG. 2, to migrate the application 135, the migration controller 110 may replace the second operating system disk 234b of the second virtual machine 125b with the snapshot 240 of the first operating system disk 234a of the first virtual machine 125a. For example, a hypervisor and/or a cloud service associated with the second virtual machine 125b may replace the second operating system disk 234b of the second virtual machine 125b by updating the properties of the second virtual machine 125b to indicate the change to the first operating system disk 234a of the first virtual machine 125a. Moreover, as FIG. 2 shows, the first virtual machine 125a may retain its first identity disk 232a and the second virtual machine 125b may retain its second identity disk 232b. Accordingly, the migration of the application 135 may be transparent to the user 150 at the client device 130 at least because the application 135 remains accessible to the user 150 despite being relocated from the first virtual machine 125a in the first region 122a to the second virtual machine 125b in the second region 122b. The migration of the application 135 may also be accomplished and the second virtual machine 125b may continue to operate within the second region 122b without changing the second identity disk 232a of the second virtual machine 125b or the directory associated with the second region 122b.

Figure 3:
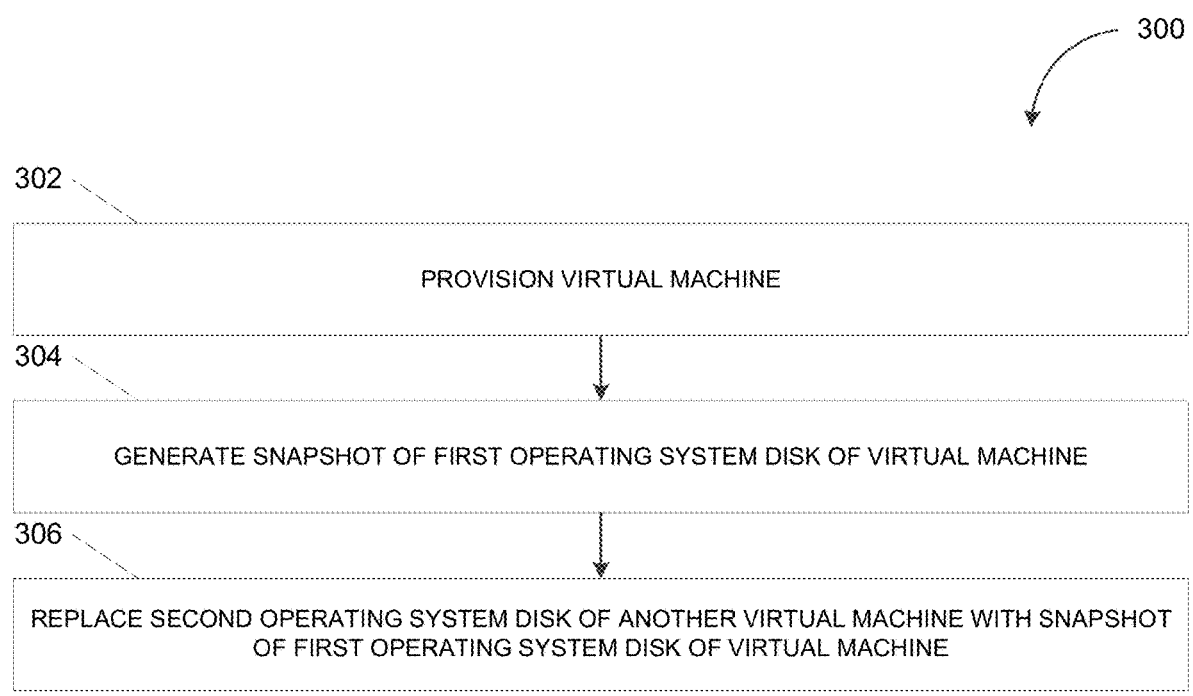
FIG. 3 depicts a flowchart illustrating an example of a process for migrating an application, in accordance with some example embodiments.

FIG. 3 depicts a flowchart illustrating an example of a process 300 for migrating an application, in accordance with some example embodiments. Referring to FIGS. 1-3, the process 300 may be performed by the migration controller 110 to migrate, for example, the application 135 from the first virtual machine 125a in the first region 122a to the second virtual machine 125b in the second region 122b.

At 302, the migration controller 110 may provision a virtual machine. For example, the migration controller 110 may interact with the first machine creation service 160a to provision the first catalog 210a including the first virtual machine 125a. The application 135, which may be a static virtual desktop that the user 150 is able to access at the client device 130, may be hosted on at least the first virtual machine 125a. Furthermore, the migration controller 110 may interact with the second machine creation service 160b, which may further interact with a hypervisor to provision the second catalog 210b including the second virtual machine 125b. It should be appreciated that in some cases, the provisioning of the first virtual machine 125a and the second virtual machine 125b may be performed, respectively, by the first machine creation service 160a and the second machine creation service 160b without any interaction with the migration controller 110.

The application 135 may, as noted, be migrated from the first virtual machine 125a to the second virtual machine 125b, as described further below. This migration may take place across different data centers and/or regions (e.g., the first region 122a and the second region 122b). Alternatively, the application 135 may be migrated across virtual machines in a same data center and/or region. In the case of a migration across regions, the first machine creation service 160a may interact with the first hypervisor 165a in the first region 122a, for example, using a corresponding application programming interface (API), to provision the first virtual machine 125a. Likewise, the second machine creation service 160b may use an application programming interface (API) of the second hypervisor 165b in the second region 122b to provision the second virtual machine 125b. The provisioning of a virtual machine, such as the first virtual machine 125a and the second virtual machine 125b, may include a systems management process that creates a new virtual machine within a physical host server and allocates computing resources to support the virtual machine.

At 304, the migration controller 110 may generate a snapshot of a first operating system disk of the virtual machine. In some example embodiments, the virtual machines may be provisioned to include an identity disk and a separate operating system (OS) disk. For example, as shown in FIG. 2, the first virtual machine 125a may be provisioned to be associated with the first identity disk 232a and the first operating system disk 234a. The second virtual machine 125b may be provisioned to be associated with the second identity disk 232b and the second operating system disk 234b. Having a separate identity disk and operating system disk may to enable the migration of the application 135 from the first virtual machine 125a in the first region 122a to the second virtual machine 125b in the second region 122b. For instance, the application 135 may be migrated by replacing the second operating system disk 234b of the second virtual machine 125b with a snapshot of the first operating system disk 234a of the first virtual machine 125a while the first virtual machine 125a and the second virtual machine 125b retains their respective identity disks.

At 306, the migration controller 110 may replace a second operating system disk of another virtual machine with the snapshot of the first operating system disk of the virtual machine to accomplish or otherwise complete the migration of the application. In some example embodiments, the migration controller 110 may replace the second operating system disk 234b of the second virtual machine 125b with the snapshot 240 of the first operating system disk 234a of the first virtual machine 125a in order to migrate the application 135 from the first virtual machine 125a in the first region 122a to the second virtual machine 125b in the second region 122b.

Figure 4:
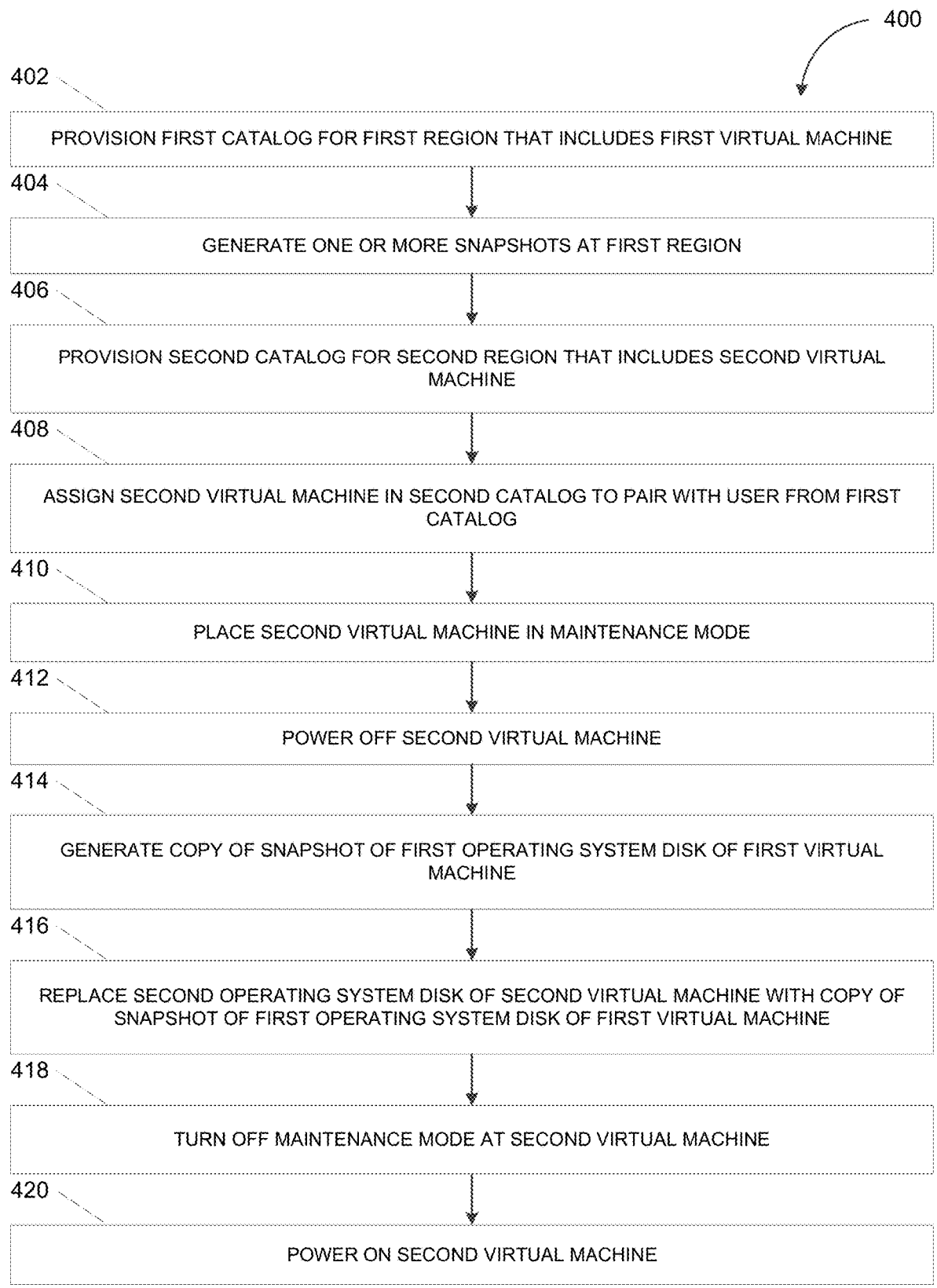
FIG. 4 depicts a flowchart illustrating another example of a process for migrating an application, in accordance with some example embodiments.

FIG. 4 depicts a flowchart illustrating another example of a process 400 for migrating an application, in accordance with some example embodiments. Referring to FIGS. 1-2 and 4, the process 400 may be performed by the migration controller 110 to migrate, for example, the application 135 from the first virtual machine 125a in the first region 122a to the second virtual machine 125b in the second region 122b.

At 402, the migration controller 110 may provision a first catalog for a first region that includes a first virtual machine. For example, the migration controller 110 may provision the first catalog 210a associated with the second region 122b, which may be a collection of virtual machines including the first virtual machine 125a that are managed as a single entity. The first virtual machine 125a may host the application 135, which may be a static virtual desktop that the user 150 is able to access at the client device 130. Moreover, the first virtual machine 125a may be provisioned with the first identity disk 232a and the first operating system disk 232a. The first operating system disk 234a may store an operating system, one or more applications, and user data associated with the application 135 whereas data providing the first virtual machine 125a with a unique identity (e.g., directory identity data and/or the like) may be stored on the first identity disk 232a.

At 404, the migration controller 110 may generate one or more snapshots at the first region. In some example embodiments, the migration controller 110 may generate snapshots of the first operation system disk 232a of the first virtual machine 125a. For example, the migration controller 110 may generate the snapshot 240 in response to detecting a request to migrate the application 135. Alternatively and/or additionally, the snapshot 240 may be generated based on a schedule or at periodic intervals (e.g., daily, weekly, and/or the like). The snapshot 240 may be generated by generating a copy of the first operating system disk 232a.

At 406, the migration controller 110 may provision a second catalog for a second region that includes a second virtual machine. For example, the migration controller 110 may provision the second catalog 210b associated with the second region 122b. The second catalog 210b may be a collection of virtual machines including the second virtual machine 125b that are managed as a single entity. The second virtual machine 125b may be provisioned with the second identity disk 232b, which may store data providing the second virtual machine 125b with a unique identity (e.g., directory identity data and/or the like. Furthermore, the second virtual machine 125b may be provisioned with the second operating system disk 234b for storing an operating system, one or more applications, and user data.

At 408, the migration controller 110 may assign the second virtual machine in the second catalog to pair with a user from the first catalog. For example, the migration controller 110 may assign the second virtual machine 125b in the second catalog 210b to pair with the user 150 including by interacting with a delivery controller to check machine user assignments in the second catalog 210b. The second virtual machine 125b may be assigned to the user 150 if the second catalog 210b indicates that the second virtual machine 125b is unassigned. The assignment may be performed in response to a request to migrate the application 135. For example, the application 135 may be migrated from the first region 122a (e.g., a data center in the United States) to the second region 122b (e.g., a data center in Australia) to maintain the performance of the application 135 if a connection to the first region 122a is associated with a below threshold performance (e.g., an above-threshold latency) and/or a poorer performance (e.g., a higher latency) than a connection to the second region 122b. Alternatively and/or additionally, the application 135 may be migrated from the first region 122a to the second region 122b to keep the application 135 operational if the first region 122a is experiencing an outage while the second region 122b is unaffected by the outage.

At 410, the migration controller 110 may place the second virtual machine in a mode of operation (e.g., a maintenance mode). For example, to migrate the application 135 from the first virtual machine 125a in the first region 122a to the second virtual machine 125b in the second region 122b, the migration controller 110 may place, in a maintenance mode, the second virtual machine 125b as well as the other virtual machines included in the second catalog 210b of the second region 122b. When the second virtual machine 125b is placed in a maintenance mode, the second virtual machine 125b may be undergoing various maintenance operations that prevent the second virtual machine 125b from being deployed, powered on, or supporting the launch of one or more sessions.

At 412, the migration controller 110 may power off the second virtual machine. Furthermore, to migrate the application 135 from the first virtual machine 125a in the first region 122a to the second virtual machine 125b in the second region 122b, the migration controller 110 may power off the second virtual machine 125b as well as the other virtual machines included in the second catalog 210b of the second region 122b. The second virtual machine 125b may be powered off in order for the replacement of the second operating system disk 234b to occur.

At 414, the migration controller 110 may generate, based at least on a snapshot of a first operating system disk of the first virtual machine, an operating system disk. For example, the migration controller 110 may generate, based at least on the snapshot 240 of the first operating system disk 234a of the first virtual machine 125a, an operating system disk for deployment.

At 416, the migration controller 110 may replace a second operating system disk of the second virtual machine with the operating system disk generated based on the snapshot of the first operating system disk of the first virtual machine. In some example embodiments, the migration controller 110 may migrate the application 135 from the first virtual machine 125a to the second virtual machine 125b by at least replacing the second operating system disk 234b of the second virtual machine 125b with an operating system disk that is generated based on the snapshot 240 of the first operating system disk 234a of the first virtual machine 125a. Because the snapshot 240 captures the state of the first operating system disk 234a at a certain point in time, which includes the state of the application 135 at that point in time, the application 135 may be migrated to the second virtual machine 125b by replacing the second operating system disk 234b with the snapshot 240 of the first operating system 234a. Moreover, the migration of the application 135 may remain transparent to the user 150. Notably, the user 150 may continue to access the same application 135, for example, from the client device 130, despite the application 135 being relocated from the first virtual machine 125a in the first region 122a to the second virtual machine 125b in the second region 122b because the application 135 is transferred from the first virtual machine 125a to the second virtual machine 125b by replacing the second operating system disk 234b with the snapshot 240 of the first operating system 234a.

It should be appreciated that the application 135 may be migrated without affecting the first identity disk 232a of the first virtual machine 125a or the second identity disk 232b of the second virtual machine 125b. Instead, because the second virtual machine 125b retains its own second identity disk 232b, the second virtual machine 125b may continue to operate in the second region 122b changing the directory associated with the second region 122b.

At 418, the migration controller 110 may change modes of operation (e.g., turn off maintenance mode) at the second virtual machine. For example, once the migration of the application 135 is complete, the migration controller 110 may turn off maintenance mode at the second virtual machine 125b as well as the other virtual machines included in the second catalog 210b of the second region 122b. As noted, while the second virtual machine 125b is in the maintenance mode, the second virtual machine 125b may not be deployed, powered on, or support the launch of one or more sessions. As such, the application 135 may be rendered accessible by turning off maintenance mode at the second virtual machine 125b.

At 420, the migration controller 110 may power on the second virtual machine. For instance, upon completing the migration of the application 135, the migration controller 110 may further power on the second virtual machine 125b such that the user 150 may access the application 135 on the second virtual machine 125b.

Figure 5A:
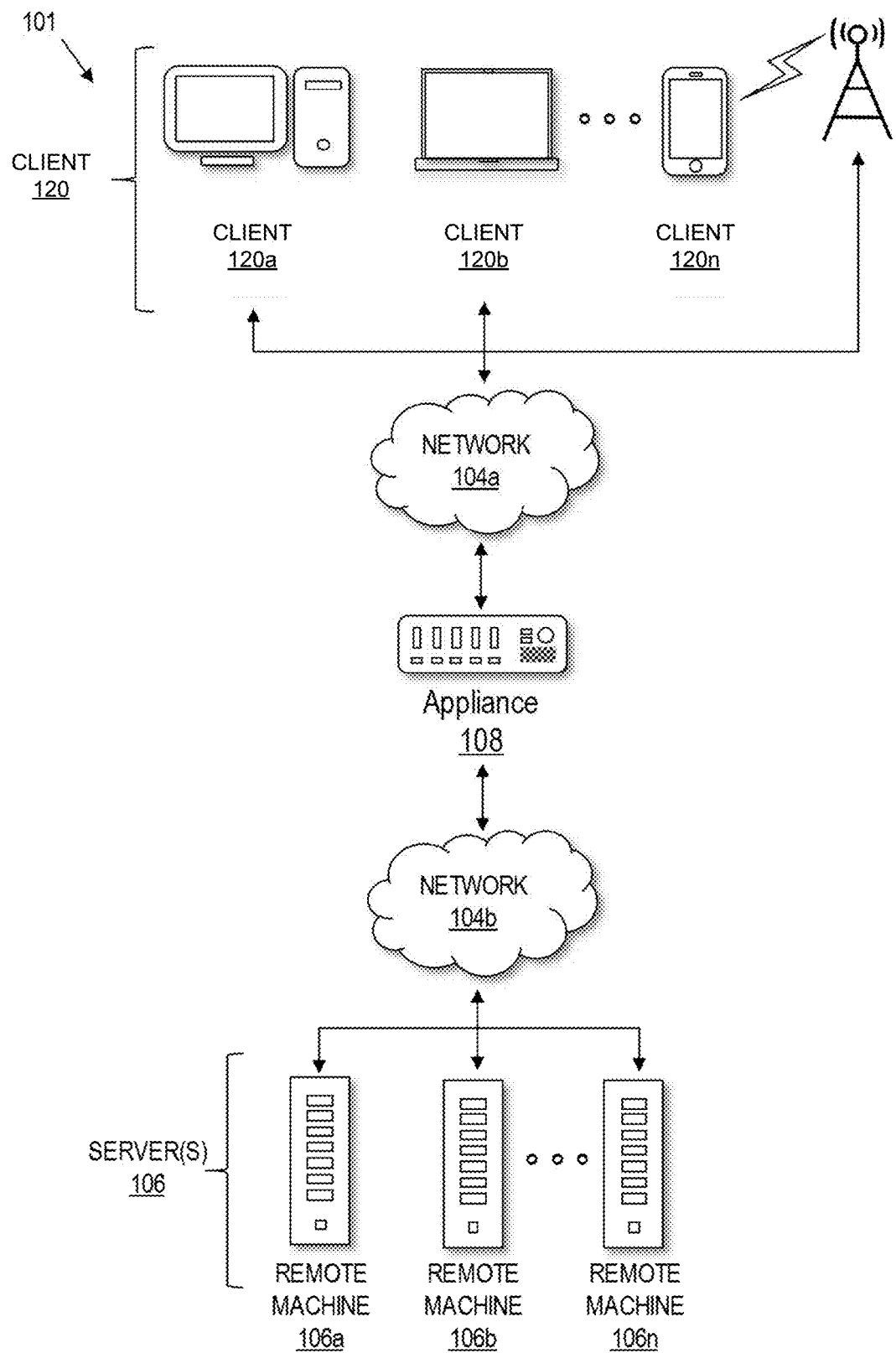
FIG. 5A depicts a network diagram illustrating an example of a network environment, in accordance with some example embodiments.

FIG. 5A depicts a network diagram illustrating an example of a network environment 101, in accordance with some example embodiments. Referring to FIGS. 1-4 and 5A, the network environment 101 in which various aspects of the disclosure may be implemented may include one or more clients 120a-120n, one or more remote machines 106a-106n, one or more networks 104a and 104b, and one or more appliances 108 installed within the network environment 101. The clients 120a-120n communicate with the remote machines 106a-106n via the networks 104a and 104b.

In some example embodiments, the clients 120a-120n may communicate with the remote machines 106a-106n via an appliance 108. The illustrated appliance 108 is positioned between the networks 104a and 104b, and may also be referred to as a network interface or gateway. In some example embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. In some example embodiments, multiple appliances 108 may be used, and the appliance(s) 108 may be deployed as part of the network 104a and/or 104b.

The clients 120a-120n may be generally referred to as client machines, local machines, clients, client nodes, client computers, client devices, computing devices, endpoints, or endpoint nodes. One or more of the clients 120a-120n may implement, for example, the client device 130 and/or the like. The remote machines 106a-106n may be generally referred to as servers or a server farm. In some example embodiments, a client 120 may have the capacity to function as both a client node seeking access to resources provided by a server 106 and as a server 106 providing access to hosted resources for other clients 120a-120n. The networks 104a and 104b may be generally referred to as a network 104. The network 104 including the networks 104a and 104b may be configured in any combination of wired and wireless networks.

The servers 106 may include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality. The servers 106 may include, for example, the migration controller 110 and/or the like.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-time-data communications; a hypertext transfer protocol (HTTP) client; a file transfer protocol (FTP) client; an Oscar client; a Telnet client; or any other set of executable instructions.

In some example embodiments, a server 106 may execute a remote presentation services program or other program that uses a thin-client or a remote-display protocol to capture display output generated by an application executing on a server 106 and transmit the application display output to a client 120.

In yet other example embodiments, a server 106 may execute a virtual machine, such as the first virtual machine 125a and/or the second virtual machine 125b, to provide, for example, to the user 150 at the client device 130, access to a computing environment such as the application 135. The virtual machine may be managed by, for example, a hypervisor (e.g., the first hypervisor 165a, the second hypervisor 165b, and/or the like), a virtual machine manager (VMM), or any other hardware virtualization technique within the server 106.

In some example embodiments, the network 104 may be a local-area network (LAN), a metropolitan area network (MAN), a wide area network (WAN), a primary public network, and/or a primary private network. Additional embodiments may include one or more mobile telephone networks that use various protocols to communicate among mobile devices. For short-range communications within a wireless local-area network (WLAN), the protocols may include 802.11, Bluetooth, and Near Field Communication (NFC).

Figure 5B:
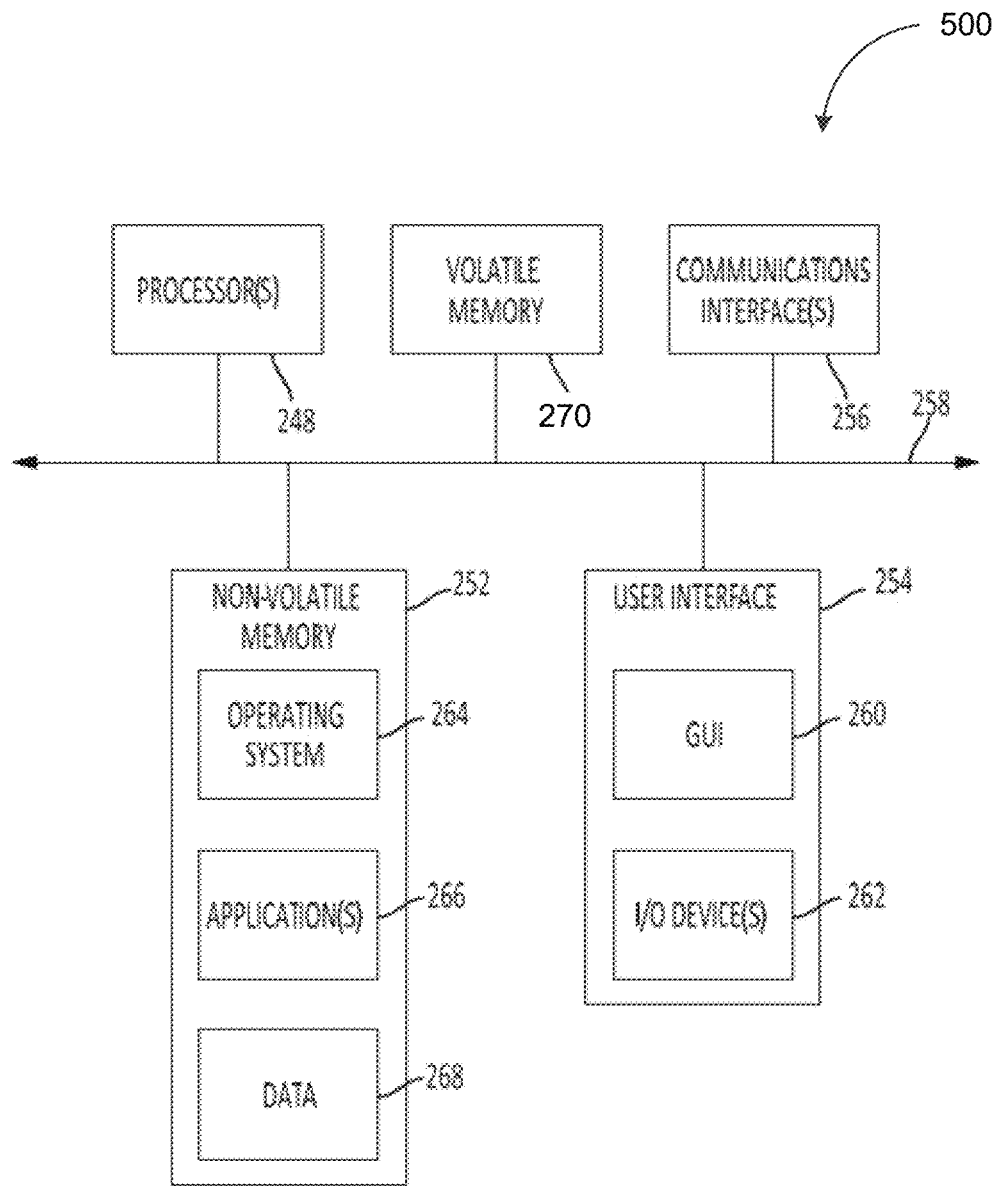
FIG. 5B depicts a block diagram illustrating an example of a computing device, in accordance with some example embodiments.

FIG. 5B depicts a block diagram illustrating an example of a computing device 500, in accordance with some example embodiments. Referring to FIGS. 1-4 and 5A-B, the computing device 500 may be useful for practicing an embodiment of the migration controller 110 and the client device 130.

As shown in FIG. 5B, the computing device 500 may include one or more processors 248, volatile memory 270 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, and/or the like) and one or more input/output (I/O) devices 262 (e.g., a mouse, a keyboard, and/or the like). The non-volatile memory 252 may store an operating system 264, one or more applications 266, and data 268 such that computer instructions of the operating system 264 and/or applications 266 are executed by the processor(s) 248 out of the volatile memory 270. Data may be entered using an input device of the GUI 260 or received from I/O device(s) 262. Various elements of the computing device 500 may communicate via communication the communication bus 258. The computing device 500 as shown in FIG. 5B is shown merely as an example, as the migration controller 110 and the client device 130 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some example embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some example embodiments, the "processor" may be one or more physical processors or one or more "virtual" (e.g., remotely located or "cloud") processors.

The communications interfaces 256 may include one or more interfaces to enable the computing device 500 to access a computer network such as a local area network (LAN), a wide area network (WAN), a public land mobile network (PLMN), and/or the Internet through a variety of wired and/or wireless or cellular connections.

As noted above, in some example embodiments, one or more computing devices 500 may execute an application on behalf of a user of a client computing device (e.g., the clients 120), may execute a virtual machine, which provides an execution session within which applications execute on behalf of a user or a client computing device (e.g., the clients 120), such as a hosted desktop session (e.g., associated with the application 135), may execute a terminal services session to provide a hosted desktop environment, or may provide access to a computing environment including one or more of: one or more applications, one or more desktop applications, and one or more desktop sessions in which one or more applications may execute.

Figure 5C:
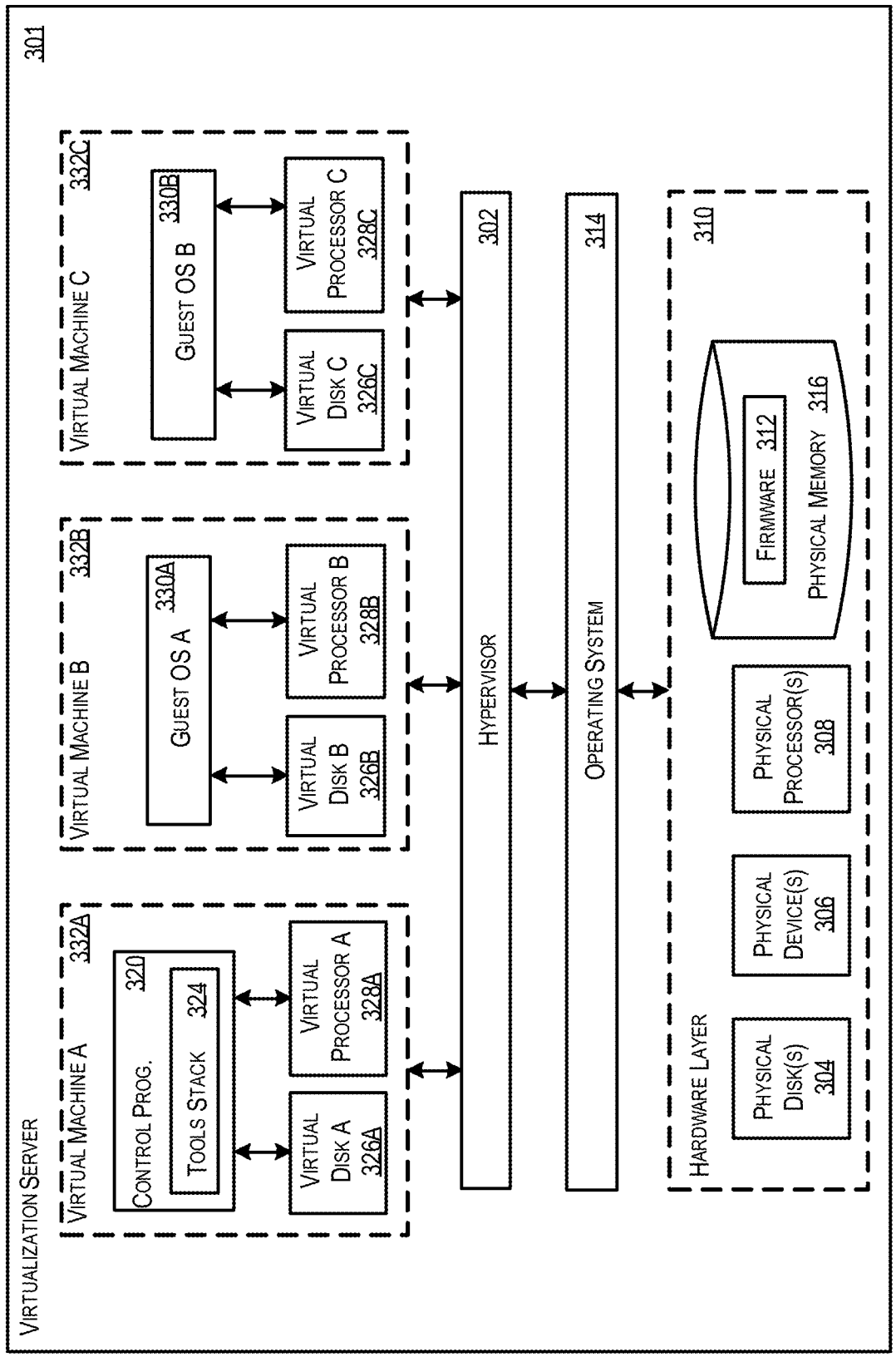
FIG. 5C depicts a high-level architecture of an example of a virtualization system for implementing a computing system, in accordance with some example embodiments.

FIG. 5C depicts a high-level architecture of an example of a virtualization system for implementing the computing system 110, in accordance with some example embodiments. As shown in FIG. 5C, the virtualization system may be a single-server or multi-server system, or a cloud system, including at least one virtualization server 301 configured to provide virtual desktops and/or virtual applications to one or more client access devices 120a-c. A desktop (or a virtual desktop) may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

Virtualization server 301 may be configured as a virtualization server in a virtualization environment, for example, a single-server, multi-server, or cloud computing environment. Virtualization server 301 illustrated in FIG. 5C may be deployed as and/or implemented by one or more embodiments of server 106 illustrated in FIG. 5A or by other known computing devices. Included in virtualization server 301 is hardware layer 310 that may include one or more physical disks 304, one or more physical devices 306, one or more physical processors 308, and one or more physical memories 316. In some embodiments, firmware 312 may be stored within a memory element in physical memory 316 and be executed by one or more of physical processors 308. Virtualization server 301 may further include operating system 314 that may be stored in a memory element in physical memory 316 and executed by one or more of physical processors 308. Still further, hypervisor 302 may be stored in a memory element in physical memory 316 and be executed by one or more of physical processors 308. Presence of operating system 314 may be optional such as in a case where the hypervisor 302 is a Type A hypervisor.

Executing on one or more of physical processors 308 may be one or more virtual machines 332A-C (generally 332). Each virtual machine 332 may have virtual disk 326A-C and virtual processor 328A-C. In some embodiments, first virtual machine 332A may execute, using virtual processor 328A, control program 320 that includes tools stack 324. Control program 320 may be referred to as a control virtual machine, Domain 0, Dom0, or other virtual machine used for system administration and/or control. In some embodiments, one or more virtual machines 332B-C may execute, using virtual processor 328B-C, guest operating system 330A-B (generally 330).

Physical devices 306 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in hardware layer 310 may include any type of memory. Physical memory 316 may store data, and in some embodiments may store one or more programs, or set of executable instructions. FIG. 5C illustrates an embodiment where firmware 312 is stored within physical memory 316 of virtualization server 301. Programs or executable instructions stored in physical memory 316 may be executed by the one or more processors 308 of virtualization server 301.

Virtualization server 301 may also include hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 may be any combination of executable instructions and hardware that monitors virtual machines 332 executing on a computing machine. Hypervisor 302 may be a Type 2 hypervisor, where the hypervisor executes within operating system 314 executing on virtualization server 301. Virtual machines may then execute at a layer above hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on virtualization server 301 by directly accessing the hardware and resources within hardware layer 310. That is, while Type 2 hypervisor 302 accesses system resources through host operating system 314, as shown, a Type 1 hypervisor may directly access all system resources without host operating system 314. A Type 1 hypervisor may execute directly on one or more physical processors 308 of virtualization server 301, and may include program data stored in physical memory 316.

Hypervisor 302, in some embodiments, may provide virtual resources to guest operating systems 330 or control programs 320 executing on virtual machines 332 in any manner that simulates operating systems 330 or control programs 320 having direct access to system resources. System resources can include, but are not limited to, physical devices 306, physical disks 304, physical processors 308, physical memory 316, and any other component included in hardware layer 310 of virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for virtual machine 332 executing on virtualization server 301. Examples of hypervisor 302 may include those manufactured by VMWare, Inc., of Palo Alto, Calif.; Xen Project® hypervisor, an open source product whose development is overseen by the open source XenProject.org community; Hyper-V®, Virtual Server®, and Virtual PC® hypervisors provided by Microsoft Corporation of Redmond, Wash.; or others. The virtualization server 301 may execute hypervisor 302 that creates a virtual machine platform on which guest operating systems 330 may execute. When this is the case, virtualization server 301 may be referred to as a host server. An example of such a virtualization server is Citrix Hypervisor® provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create virtual machine 332. The virtual machine image may refer to a collection of data, states, instructions, etc. that make up an instance of a virtual machine. In other embodiments, hypervisor 302 may execute guest operating system 330 within virtual machine 332. In still other embodiments, virtual machine 332 may execute guest operating system 330.

In addition to creating virtual machines 332, hypervisor 302 may control the execution of at least one virtual machine 332. The hypervisor 302 may present at least one virtual machine 332 with an abstraction of at least one hardware resource provided by virtualization server 301 (e.g., any hardware resource available within hardware layer 310). In some implementations, hypervisor 302 may control the manner in which virtual machines 332 access physical processors 308 available in virtualization server 301. Controlling access to physical processors 308 may include determining whether virtual machine 332 should have access to processor 308, and how physical processor capabilities are presented to virtual machine 332.

As shown in FIG. 5C, the virtualization server 301 may host or execute one or more virtual machines 332. Virtual machine 332 may be a set of executable instructions and/or user data that, when executed by processor 308, may imitate the operation of a physical computer such that virtual machine 332 can execute programs and processes much like a physical computing device. While FIG. 5C illustrates an embodiment where virtualization server 301 hosts three virtual machines 332, in other embodiments virtualization server 301 may host any number of virtual machines 332. Hypervisor 302 may provide each virtual machine 332 with a unique virtual view of the physical hardware, including memory 316, processor 308, and other system resources 304, 306 available to that virtual machine 332. The unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to virtual machines 332.

Each virtual machine 332 may include virtual disk 326A-C (generally 326) and virtual processor 328A-C (generally 328.) Virtual disk 326 may be a virtualized view of one or more physical disks 304 of virtualization server 301, or a portion of one or more physical disks 304 of virtualization server 301. The virtualized view of physical disks 304 may be generated, provided, and managed by hypervisor 302. In some embodiments, hypervisor 302 may provide each virtual machine 332 with a unique view of physical disks 304. These particular virtual disk 326 (included in each virtual machine 332) may be unique, when compared with other virtual disks 326.

Virtual processor 328 may be a virtualized view of one or more physical processors 308 of virtualization server 301. The virtualized view of physical processors 308 may be generated, provided, and managed by hypervisor 302. Virtual processor 328 may have substantially all of the same characteristics of at least one physical processor 308. Virtual processor 308 may provide a modified view of physical processors 308 such that at least some of the characteristics of virtual processor 328 are different from the characteristics of the corresponding physical processor 308.

One or more aspects or features of the subject matter described herein can be realized in digital electronic circuitry, integrated circuitry, specially designed application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions, which when executed by the least one data processor, cause the at least one data processor to at least:
   provision a first virtual machine to host an application, the first virtual machine including a first operating system disk;
   generate a snapshot of the first operating system disk, the snapshot comprising data capturing a state of the first operating system disk at a particular point in time; and
   migrate the application to a second virtual machine hosted in a different data center than the first virtual machine, the migration including replacement of a second operating system disk of the second virtual machine with use of the snapshot of the first operating system disk while a first identity disk of the first virtual machine and a second identity disk of the second virtual machine remain unchanged by the migration of the application.

2. The system of claim 1, wherein the application comprises a virtual desktop configured to provide, at a client device communicatively coupled with at least the first virtual machine or the second virtual machine, a desktop operating system.

3. The system of claim 2, wherein the first operating system disk stores data associated with the virtual desktop, and wherein the data includes an operating system, one or more applications, and a user data.

4. The system of claim 2, wherein the virtual desktop comprises a static virtual desktop configured to retain one or more changes applied to the virtual desktop upon restarting the first virtual machine or the second virtual machine hosting the virtual desktop.

5. The system of claim 1, wherein the first virtual machine is provisioned with the first identity disk storing a first data, wherein the first data provides the first virtual machine with a first identity, wherein the second virtual machine is provisioned with the second identity disk storing a second data, wherein the second data provides the second virtual machine with a second identity different than the first of the first virtual machine.

6. The system of claim 1, wherein the first virtual machine is included in a first data center and the second virtual machine is included in a second data center.

7. The system of claim 6, wherein the first data center and the second data center are included in a same region or different regions, and wherein the regions comprise one or more data centers within a latency-defined perimeter and connected through a dedicated regional low-latency network.

8. The system of claim 6, wherein the application is migrated in response to the first data center having performance below a threshold or the second data center having a better performance than the first data center.

9. The system of claim 6, wherein the application is migrated in response to an outage at the first data center.

10. The system of claim 1, wherein the migrating of the application further includes placing the second virtual machine in a maintenance mode or powering off the second virtual machine prior to replacement of the second operating system disk.

11. The system of claim 1, wherein the provisioning of the first virtual machine includes providing a first catalog including the first virtual machine.

12. The system of claim 1, wherein the snapshot of the first operating system disk is generated in response to a request to migrate the virtual desktop.

13. The system of claim 1, wherein the snapshot of the first operating system disk is generated based on a schedule or a periodic intervals.

14. A computer-implemented method, comprising:
    provisioning a first virtual machine to host an application, the first virtual machine including a first operating system disk;
    generating a snapshot of the first operating system disk, the snapshot comprising data capturing a state of the first operating system disk at a particular point in time; and
    migrating the application to a second virtual machine hosted in a different data center than the first virtual machine, the migration including replacement of a second operating system disk of the second virtual machine with use of the snapshot of the first operating system while a first identity disk of the first virtual machine and a second identity disk of the second virtual machine remain unchanged by the migration of the application.

15. The method of claim 14, wherein the application comprises a virtual desktop configured to provide, at a client device communicatively coupled with at least the first virtual machine or the second virtual machine, a desktop operating system.

16. The method of claim 15, wherein the first operating system disk stores data associated with the virtual desktop, and wherein the data includes an operating system, one or more applications, and a user data.

17. The method of claim 15, wherein the virtual desktop comprises a static virtual desktop configured to retain one or more changes applied to the virtual desktop upon restarting the first virtual machine or the second virtual machine hosting the virtual desktop.

18. The method of claim 14, wherein the first virtual machine is provisioned with the first identity disk storing a first data, wherein the first data provides the first virtual machine with a first identity, wherein the second virtual machine is provisioned with the second identity disk storing a second data, wherein the second data provides the second virtual machine with a second identity different than the first of the first virtual machine.

19. The method of claim 14, wherein the first virtual machine is included in a first data center and the second virtual machine is included in a second data center, wherein the first data center and the second data center are included in a same region or different regions, and wherein the regions comprise one or more data centers within a latency-defined perimeter and connected through a dedicated regional low-latency network.

20. A non-transitory computer readable medium storing instructions, which when executed by at least one data processor, result in operations comprising:
provisioning a first virtual machine to host an application, the first virtual machine including a first operating system disk;
generating a snapshot of the first operating system disk, the snapshot comprising data capturing a state of the first operating system disk at a particular point in time; and
migrating the application to a second virtual machine hosted in a different data center than the first virtual machine, the migration including replacement of a second operating system disk of the second virtual machine with use of the snapshot of the first operating system disk while a first identity disk of the first virtual machine and a second identity disk of the second virtual machine remain unchanged by the migration of the application.

21. A system, comprising:
at least one data processor; and
at least one memory storing instructions, which when executed by the least one data processor, cause the at least one data processor to at least:
provision a first virtual machine to host an application, the first virtual machine including a first operating system disk;
generate a snapshot of the first operating system disk, the snapshot comprising data capturing a state of the first operating system disk at a particular point in time; and
migrate the application to a second virtual machine, the migration including replacement of a second operating system disk of the second virtual machine with use of the snapshot of the first operating system disk while a first identity disk of the first virtual machine and a second identity disk of the second virtual machine remain unchanged by the migration of the application;
wherein the first virtual machine is included in a first data center, wherein the first data center and the second data center are included in a same region or different regions, and wherein the regions comprise one or more data centers within a latency-defined perimeter and connected through a dedicated regional low-latency network.

22. A computer-implemented method, comprising:
provisioning a first virtual machine to host an application, the first virtual machine including a first operating system disk;
generating a snapshot of the first operating system disk, the snapshot comprising data capturing a state of the first operating system disk at a particular point in time; and
migrating the application to a second virtual machine, the migration including replacement of a second operating system disk of the second virtual machine with use of the snapshot of the first operating system while a first identity disk of the first virtual machine and a second identity disk of the second virtual machine remain unchanged by the migration of the application;
wherein the first virtual machine is included in a first data center and the second virtual machine is included in a second data center, wherein the first data center and the second data center are included in a same region or different regions, and wherein the regions comprise one or more data centers within a latency-defined perimeter and connected through a dedicated regional low-latency network.

\* \* \* \* \*